(12) United States Patent
Khasnabish et al.

(10) Patent No.: US 8,705,350 B2
(45) Date of Patent: *Apr. 22, 2014

(54) METHODS AND SYSTEMS FOR MAINTAINING QUALITY OF SERVICE (QOS) LEVELS FOR DATA TRANSMISSIONS

(75) Inventors: Bhumip Khasnabish, Lexington, MA (US); Nabeel Cocker, New Hyde Park, NY (US)

(73) Assignee: Verizon Services Corp., Ashburn, VA (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/766,326

(22) Filed: Apr. 23, 2010

(65) Prior Publication Data

US 2010/0265826 A1    Oct. 21, 2010

Related U.S. Application Data

(63) Continuation of application No. 11/114,645, filed on Apr. 25, 2005, now Pat. No. 7,715,312.

(51) Int. Cl.
  *G01R 31/08*    (2006.01)
  *H04L 12/28*    (2006.01)
  *H04L 12/66*    (2006.01)

(52) U.S. Cl.
  USPC .......... 370/230; 370/235; 370/351; 370/352; 370/395.21

(58) Field of Classification Search
  USPC .................... 370/229–235, 395.21
  See application file for complete search history.

(56) References Cited

U.S. PATENT DOCUMENTS

| | | | |
|---|---|---|---|
| 6,577,595 B1 | 6/2003 | Counterman | |
| 7,085,230 B2 * | 8/2006 | Hardy | 370/232 |
| 7,133,365 B2 * | 11/2006 | Klinker et al. | 370/238 |
| 7,295,608 B2 * | 11/2007 | Reynolds et al. | 375/240.01 |
| 2002/0145981 A1 * | 10/2002 | Klinker et al. | 370/244 |
| 2002/0194362 A1 | 12/2002 | Rawlins et al. | |
| 2003/0072263 A1 * | 4/2003 | Peterson | 370/235 |
| 2003/0088671 A1 * | 5/2003 | Klinker et al. | 709/225 |
| 2003/0133443 A1 | 7/2003 | Klinker et al. | |
| 2003/0185154 A1 * | 10/2003 | Mullendore et al. | 370/230 |
| 2004/0042402 A1 * | 3/2004 | Galand et al. | 370/237 |
| 2004/0190527 A1 | 9/2004 | Okura et al. | |
| 2004/0202157 A1 | 10/2004 | Chase et al. | |
| 2004/0210670 A1 * | 10/2004 | Anerousis et al. | 709/238 |
| 2005/0078686 A1 * | 4/2005 | Pajunpaa | 370/395.64 |
| 2005/0097219 A1 * | 5/2005 | Goguen et al. | 709/238 |
| 2005/0122999 A1 * | 6/2005 | Scherzer et al. | 370/480 |
| 2005/0232274 A1 * | 10/2005 | Kadambi et al. | 370/392 |

FOREIGN PATENT DOCUMENTS

| | | |
|---|---|---|
| EP | 1463248 | 9/2004 |
| WO | WO-03/032563 | 4/2003 |

* cited by examiner

*Primary Examiner* — Brandon Renner (57) ABSTRACT

A system is provided for maintaining Quality of Service ("QoS") parameters of data transmissions. A packet-switched network framework is provided. The network framework includes at least one router for routing the data transmissions over the network framework. The network framework also includes multiple links, including a first link and a second link. The first link forms at least part of a first path over the network framework, and the second link forms at least part of an alternate, second path over the network framework. A link utilization monitor is configured to monitor a link utilization rate of the first link and to determine whether the rate has exceeded a predetermined maximum utilization threshold. The router is configured to reroute data transmissions over the second link when the rate is determined to have exceeded the predetermined maximum utilization threshold.

23 Claims, 7 Drawing Sheets

METHODS AND SYSTEMS FOR MAINTAINING QUALITY OF SERVICE (QOS) LEVELS FOR DATA TRANSMISSIONS

CROSS-REFERENCES TO RELATED APPLICATION

The present application is a continuation of co-pending U.S. patent application Ser. No. 11/114,645, filed Apr. 25, 2005, entitled "METHODS AND SYSTEMS FOR MAINTAINING QUALITY OF SERVICE (QOS) LEVELS FOR DATA TRANSMISSIONS", which is hereby incorporated by reference in its entirety.

BACKGROUND

Many types of data transmissions have emerged that require certain transmission quality levels to maintain the integrity of the data when the data is transmitted over packet-switched networks (e.g., internet protocol networks). Video-on-demand and voice services are examples of such data transmissions. Voice services over internet protocol networks, commonly referred to as VoIP, are an emerging alternative to standard voice services over circuit-switched telephone networks, largely because of the potential cost savings provided by VoIP. By using packet-switched networks (e.g., the Internet) to transmit voice services, callers are able to avoid long distance fees associated with using a telephone carrier's traditional circuit-switched telephony networks.

However, implementation of VoIP has proved to be a challenging task with respect to providing the same voice quality typically offered by traditional circuit-switched telephone services. One aspect that makes high-quality VoIP a challenging task is congestion of internet protocol (IP) networks. When IP networks become congested, data transmissions experience longer transmission delays that may not meet minimum quality standards. Moreover, when IP networks are used to transport different types of data (e.g., voice transmissions and more typical types of digital data), chances of congestion increase, especially when minimum quality standards are required for more than one particular data transmission over the network.

Further, the common use of IP networks for transmitting various types of data, as well as associated control signaling, tends to complicate timing issues for data transmissions. Not only does control signaling require responses to messages within pre-specified time intervals, as mentioned above, time-criticalness is also required for many types of media data traffic transmissions (e.g., video-on-demand and voice services transmissions). The wide variety of timing requirements for the different types of transmissions tends to complicate network timing, which can undesirably affect the quality of transmissions that have minimum quality standards. In particular, excessive packet loss, transmission delay, or variation in transmission delays (i.e., jitter) may degrade the quality of transmitted data signals, including voice services transmissions. Moreover, bandwidth limitations, lengths of network paths, and other network parameters may also undesirably affect the quality of data transmissions over IP networks.

Parameters used to define and measure the quality of data transmissions over IP networks are commonly referred to as quality-of-service (QoS) parameters, which include parameters such as packet loss, delay, and jitter. To help control QoS parameters for data transmissions, many traditional VoIP services have implemented admission controls for selecting which data transmissions (e.g., which telephone calls) to admit for transmission over the IP network based on a pre-defined order of priority. If, for example, the IP network cannot handle additional telephone calls of lower priority than the already admitted, telephone calls, the call admission controls will not admit the additional telephone calls for transmission over the IP network. While call admission controls have helped to prevent instances of voice quality degradation by preventing congestion of IP networks, call admission controls have several drawbacks. For example, when call admission controls are relied upon solely or primarily to maintain voice quality parameters, customer satisfaction is often jeopardized whenever callers are unable to place calls due to a lads of network availability. The inability to place calls can easily cause would-be callers to feel dissatisfied with the VoIP services offered by service carriers. In turn, the users' unsatisfactory experiences may cause service carriers to suffer a loss of business, reputation, or goodwill.

In short, conventional IP networks do not transmit data in a manner that consistently satisfies minimum quality standards required by many types of data transmissions (e.g., voice services transmissions).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

The presently disclosed methods and systems provide for the maintenance of quality-of-service (QoS) levels for data transmissions. A network framework is provided. Data transmissions are transmitted over the network framework. QoS parameters and network link utilization rates associated with the data transmissions are monitored, thereby enabling network operators to determine network link utilization thresholds, which are defined as the link utilization rates at which the QoS parameters of the data transmissions begin to degrade below predetermined quality standards.

The determined link utilization thresholds may be used to deliver and maintain data transmissions with desired QoS levels. The utilization thresholds may be implemented to provide desired QoS levels in links of the provided network framework and/or in links of similar operational packet-switched networks. By using the determined link utilization thresholds to limit link utilization rates, the available bandwidth of packet-switched network links can be utilized to the extent allowable without degrading data quality below the predetermined quality standards. Consequently, network resources are allocated so that subscribers do not experience undesirable degradations in data quality or, even worse, not being able to have their data transmissions admitted for transmission over packet-switched networks. In some embodiments, the data transmissions comprise voice services transmissions. Certain embodiments of the present systems and methods will now be described in detail.

I. Introduction of Elements

Figure 1:
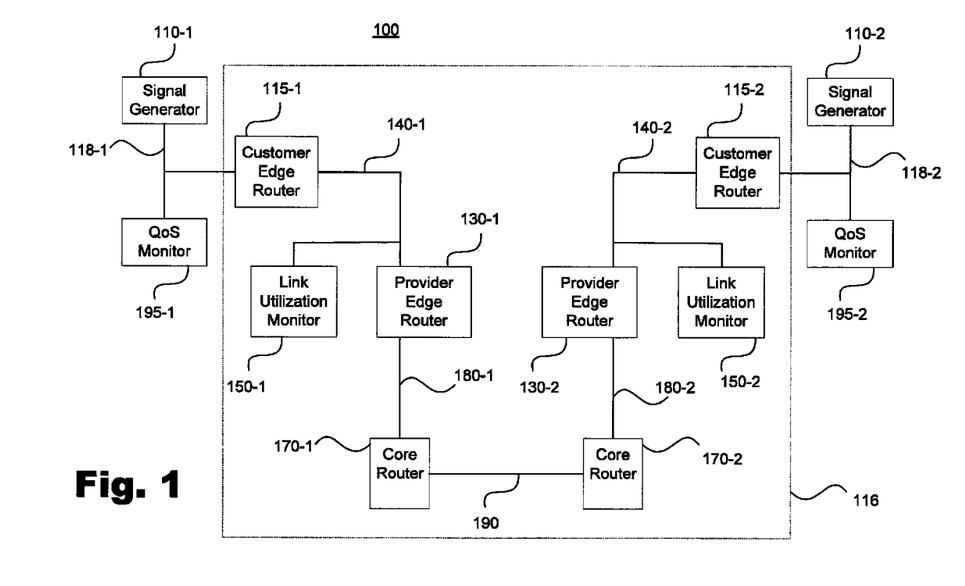
FIG. 1 is a block diagram of a system for simulating and monitoring data transmissions over a network framework, according to one embodiment.

FIG. 1 is a block diagram of a system 100 for simulating and monitoring voice transmissions over a network framework, according to one embodiment. The system 100 is configured to monitor QoS parameters and link utilization rates associated with the simulated voice transmissions, as described below.

A. Signal Generator

As shown in FIG. 1, signal generators 110-1 and 110-2 (collectively "signal generators 110") are in connection with respective customer edge routers 115-1 and 115-2 (collectively "customer edge routers 115") of a network framework 116. In the embodiment of FIG. 1, the signal generators 110 are located outside of the network framework 116, and the customer edge routers 115 are part of the network framework 116. Connections 118-1 and 118-2 (collectively "connections 118") between the signal generators 110 and the customer edge routers 115 may include any known media and/or protocols (e.g., Ethernet) capable of carrying data transmissions. The connections 118 may be direct or indirect connections between the signal generators 110 and the customer edge routers 115.

The signal generators 110 are configured to make, maintain, and terminate different mixes and loads of data traffic over the network framework 116. In particular, the signal generators 110 may generate different quantities of data streams (i.e., data transmissions) over the network framework 116. Accordingly, the signal generators 110 are able to increase and decrease the quantity of data streams that are active on the system 100. By generating or transmitting data streams, or simulated data streams, the signal generators 110 are able to generate different traffic loads on the network framework 116.

In some embodiments, the signal generators 110 are able to generate voice services transmissions (e.g., voice telephone calls) in the form of packetized data streams suitable for use with VoIP applications and packet-switched networks. For example, IP-based telephone call data streams may be generated in accordance with known protocols for carrying voice data, including G.711 and G.729b protocols, which are well known to those skilled in the art. The data streams may comprise real-time transfer protocol (RTP) streams.

The signal generators 110 may include any device(s) and/or instructions capable of generating and/or transmitting data streams, including voice transmission streams suitable for VoIP applications. The devices may include but are not limited to known IP telephones, session initiation protocol (SIP) telephones, IP/PBXs, servers, gateways (e.g., internet protocol to public switched telephone network (IP/PSTN) gateways and media gateway control protocol (MGCP) gateways), integrated access devices (IADs) capable of transmitting voice packet data streams; modems; network interface cards, video servers, and any other device capable of providing data streams for transmission over the network framework 116. In one embodiment, the signal generators 110 include SIP-based VoIP call generators or verifiers.

In some embodiments, the signal generators 110 may not be limited solely to generating data transmissions. In particular, the signal generators 110 may be configured to receive incoming data transmissions. For example, in one embodiment the signal generator 110-1 may transmit a telephone call over the network framework 116 shown in FIG. 1 to the signal generator 110-2, which will receive the incoming telephone call. Further, the signal generators 110 may include any of the QoS monitoring capabilities described below. As discussed below in greater detail, QoS monitoring includes, for example, monitoring parameters (e.g., delay, jitter, packet loss) for an RTP stream, and mapping the parameters to mean opinion score (MOS) for VoIP applications.

While FIG. 1 shows only one signal generator 110-1 in connection with one customer edge router 115-1, those skilled in the art will appreciate that multiple signal generators 110 may be in connection with and transmit data streams to one customer edge router 115-1. In other words, multiple signal generators 110 may be connected to the customer edge router 115-1 to form a sub-network of endpoints useful for establishing simulated data transmissions over the network framework 116.

B. Network Framework

The network framework 116 is made of components and links configured to form paths over the network framework 116 and between different endpoints. The network framework 116 may comprise or be part of a packet-switched network capable of carrying data transmissions between endpoints such as the signal generators 110. Accordingly, network operators may use the network framework 116 to monitor and determine link utilization thresholds for links of operational packet-switched networks. This may be performed during operation, provisioning, maintenance, or other events associated with packet-switched networks.

Alternatively, the network framework 116 may be configured to emulate at least part of a packet-switched network. For example, the network framework 116 may include components suitable for emulating characteristics of components of operational packet-switched networks. Accordingly, the network framework 116 can be used to model links of packet-switched networks. Data transmissions can be simulated over the links of the network framework 116 and used to determine link utilization thresholds, which may be implemented in links of operational packet-switched networks. The components and links of the network framework 116 shown in FIG. 1 will now be described in detail.

1. Customer Edge Router

The customer edge routers 115 are configured to receive the data streams generated by the signal generators 110 and to route the data streams to provider edge routers 130-1 and 130-2 (collectively "provider edge routers 130"). For data streams traveling through the customer edge routers 115 in the opposite direction (i.e., from provider edge routers 130 toward signal generators 110), the customer edge routers 115 are configured to route the data streams to the appropriate signal generators 110 or to other destinations.

In one embodiment, the customer edge routers 115 comprise virtual routers configured to activate and deactivate connective links with the provider edge routers 130. The customer edge routers 115 may be implemented using known routing devices. The activation and deactivation of links between the customer edge routers 115 and the provider edge routers 130 will be described in more detail below.

2. Access Link

Access links 140-1 and 140-2 (collectively "access links 140") connect the customer edge routers 115 with the provider edge routers 130. When data streams travel over the access links 140 in the direction from the customer edge routers 115 to the provider edge routers 130, the access links 140 are referred to as ingress links 140. When the data streams travel over the access links 140 in the opposite direction, the access links 140 are referred to as egress-links 140.

The access links 140 may include any media capable of carrying the data streams between the customer edge routers 115 and the provider edge routers 130. For example, the access links 140 may include one or more permanent virtual circuits (PVCs) (see items 230 of FIG. 2) or virtual local area networks (VLANs) configured to provide ingress and egress networks or links. In one embodiment, the access links 140 are made up of a plurality of provisioned asynchronous transfer mode (ATM) constant bit rate (CBR) PVCs, which will be understood by those skilled in the art. The PVCs may have different bandwidth capacities. However, in one embodiment, each of the PVCs has a bandwidth capacity of approximately 512 kilobits per second.

Each of the PVCs or VLANs may be individually activated or deactivated by the customer edge routers 115 and/or provider edge routers 130, thereby allowing the amount of available bandwidth of the access links 140 to be adjusted. Consequently, individual PVCs may be activated or deactivated based on measured utilization rates of the access links 140, as discussed below.

3. Link Utilization Monitor

Link utilization monitors 150-1 and 150-2 (collectively "link utilization monitors 150") are in connection with the access links 140 and are each disposed between a particular customer edge router 115 and a particular provider edge router 130, as shown in FIG. 1. The link utilization monitors 150 may be connected with the access links 140 at any point or points along the access link 140. Although not shown in FIG. 1, the link utilization monitors 150 may alternatively be connected with the customer edge routers 115 or the provider edge routers 130.

The link utilization monitors 150 may include any device or devices, physical or logical, capable of monitoring and determining link utilization rates, including devices known in the art. The link utilization monitors 150 may be stand-alone devices or may be integrated with other devices. For example, the link utilization monitors 150 may be integrated with the customer edge routers 115, the provider edge routers 130, or devices in which the provider edge routers 130 and/or the customer edge routers 115 are deployed.

Link utilization rate is generally a measure of the fraction or percentage of the bandwidth capacity of a link that is being utilized by data transmissions over the link. For example, if a particular link has a bandwidth capacity of 512 kilobits per second, and 256 kilobits per second are being transmitted over the link, the utilization of the link is fifty percent.

As data streams are transported over the access links 140, the link utilization monitors 150 can dynamically monitor and determine the link utilization rates of the access links 140. Thus, the link utilization monitors 150 are able to track current link utilization rates. The monitored link utilization rates are useful for determining link utilization thresholds, which are, in turn, useful for delivering and maintaining QoS levels for data transmissions, as discussed below.

4. Provider Edge Router

The provider edge routers 130 are configured to receive data streams from the customer edge routers 115 and to route the data streams to core routers 170-1 and 170-2 (collectively "core routers 170"). For data streams traveling through the provider edge routers 130 in the opposite direction (i.e., from provider edge routers 130 toward customer edge routers 115), the provider edge routers 130 are configured to route the data streams to the appropriate customer edge routers 115.

In one embodiment, the provider edge routers 130 comprise virtual routers configured to activate and deactivate the links or networks that make up the access links 140 between the provider edge routers 130 and the customer edge routers 115. The provider edge routers 130 may be implemented using known routing devices. The activation and deactivation of the access links 140 between the customer edge routers 115 and the provider edge routers 130 will be described in more detail below.

5. Transport Link

Transport links 180-1 and 180-2 (collectively "transport links 180") connect the provider edge routers 130 with their respective core routers 170. The transport links 180 may include any transmission medium or media suitable for packet data stream transmission. In one embodiment, the transport links 180 are made up of asynchronous transfer mode (ATM) optical carrier three (OC 3) media, which are known to those skilled in the art.

6. Core Router

The core routers 170-1 and 170-2 are able to route data streams between each other over a core network link 190. As known to those skilled in the art, core routers 170 are typically connection points to a backbone network and can include switching computers equipped to transfer data over core networks.

7. Core Network Link

The core network link 190 can include any packet-switched network medium or media capable of carrying data streams between the core routers 170. For example, the core network link 190 may be an internet protocol (IP), multi-protocol label switching (MPLS), or IP/MPLS network medium or media. In one embodiment, the core network link 190 includes at least one packet-over-SONET (POS) optical carrier twelve (OC-12) medium connecting the core routers 170 to each other.

C. QoS Monitor

QoS monitors 195-1 and 195-2 (collectively "QoS monitors 195") are configured to monitor end-to-end QoS parameters of data transmissions. The QoS monitors 195 may be configured to monitor QoS parameters at locations behind the customer edge routers 115. As shown in FIG. 1, the QoS monitors may be connected to the links 118 between the call edge routers 115 and the signal generators 110. Alternatively, the QoS monitors 195 may be integrated with the signal generators 110, the customer edge routers 115, and/or devices in which the signal generators 110 or the customer edge routers 115 are deployed.

The QoS monitors 195 may include one or more devices and/or instructions for monitoring various parameters. For example, when data transmissions are voice-based, the parameters may relate to voice quality and QoS. For example, the QoS monitors 195 may be configured to monitor mean opinion scores (MOS), perceptual evaluation of speech quality (PESQ), packet loss, delay, jitter, and other parameters associated with the quality of data transmissions. To measure these various QoS parameters, the QoS monitors 195 may include digital speech level analyzers (DSLAs), VoIP Call analyzers, network protocol analyzers, and any other known devices and/or computer instructions (e.g., software) useful for measuring network transmission parameters.

The QoS parameters monitored by the QoS monitors 195 are useful for determining whether data transmissions are being delivered at a desired level of quality. For example, when the data transmissions comprise voice services transmissions, it is typically desirable for the voice services transmissions to exhibit a PSTN-grade (also known as toll-quality) voice quality, which is often defined as a mean opinion score (MOS) of at least approximately 4.0. For business-grade voice services, a MOS of approximately 3.5 to 4.0 is expected.

By monitoring QoS parameters, data transmission quality can be quantitatively determined. The QoS parameter values can be used by network operators to determine whether data transmissions are at an acceptable quality level by comparing the determined values to predetermined quality thresholds (e.g., a MOS of 4.0 for PSTN-grade voice services). The determined QoS parameters may then be used to identify key link utilization rates at which the QoS parameters deteriorate below the predetermined quality thresholds, which will be discussed in more detail below with reference to examples of data transmissions being simulated by another embodiment of the system 100, which embodiment is shown in FIG. 2.

II. Voice Traffic Simulations

Figure 2:
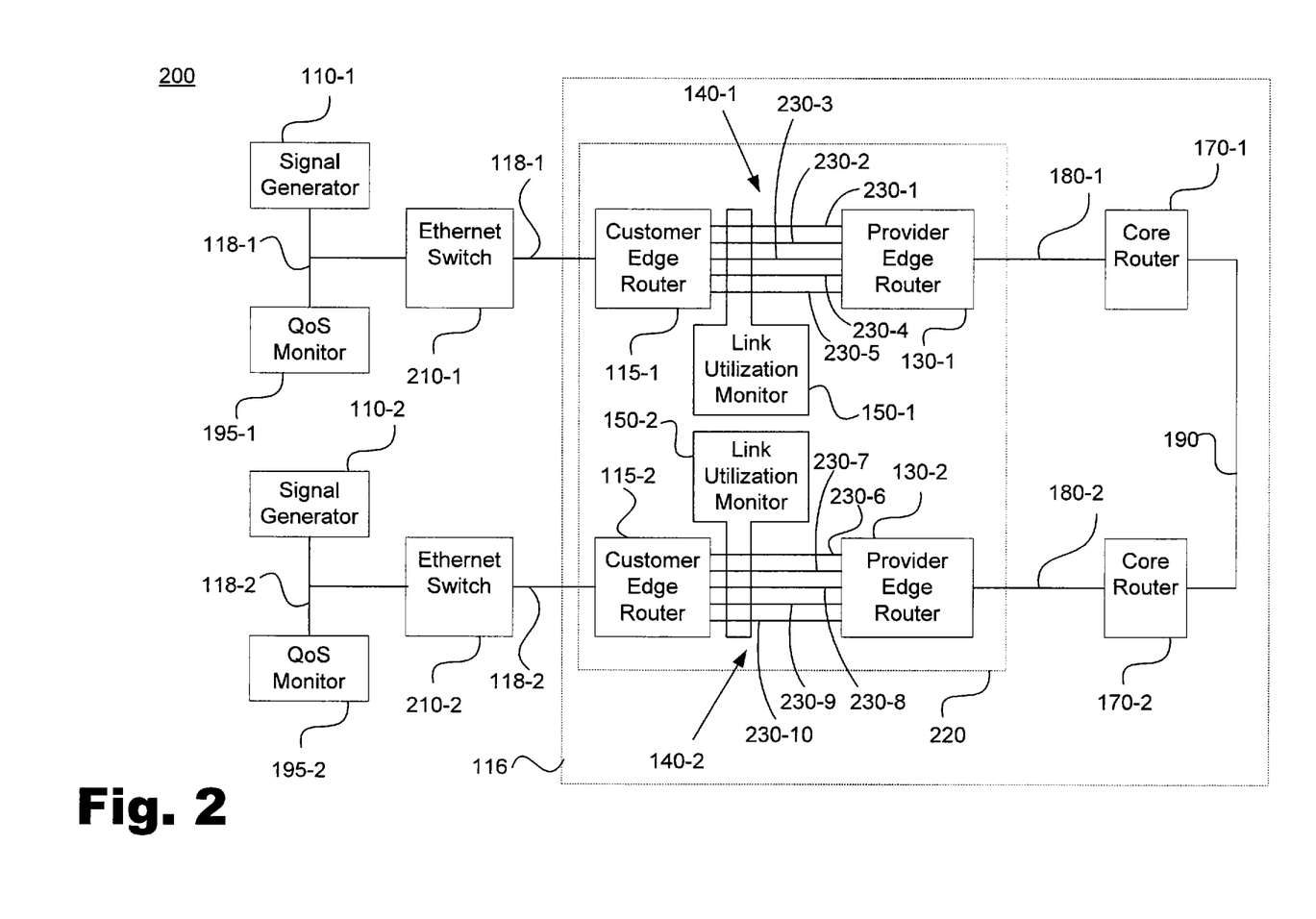
FIG. 2 is a block diagram illustrating another embodiment of the system of FIG. 1.

FIG. 2 is a block diagram illustrating another embodiment of the system 100 of FIG. 1. As shown in FIG. 2, system 200 is similar to the system 100 shown in FIG. 1. The system 200 includes Ethernet switches 210-1 and 210-2 (collectively "Ethernet switches 210") configured to form the connections 118 between the signal generators 110, the QoS monitors 195, and the customer edge routers 115. The customer edge routers 115 are in connection with the provider edge routers 130. The customer edge routers 115 and provider edge routers 130 are implemented as virtual routers in an edge router 220.

The edge router 220 may comprise any known device in which virtual routers may be implemented to form permanent virtual circuits (PVCs) 230 connecting the virtual routers to each other. The PVCs 230 may form the access links 140 discussed above. In particular, PVCs 230-1, 230-2, 230-3, 230-4, and 230-5 form the access link 140-1 between customer edge router 115-1 and provider edge router 130-1, while PVCs 230-6, 230-7, 230-8, 230-9, and 230-10 form the access link 140-2 between customer edge router 115-2 and provider edge router 130-2.

While FIG. 2 shows five PVCs 230 forming connections between each customer edge router 115 and provider edge router 130, different quantities of PVCs 230 may be used to provide different amounts of bandwidth between the customer edge routers 115 and the provider edge routers 130. In one embodiment, each of the PVCs 230 has a bandwidth capacity of approximately 512 kilobits per second.

The PVCs 230 are arranged to provide links forming alternate paths over the access links 140. For example, PVC 230-1 forms a first link that makes up at least part of a first path over the access link 140-1. PVC 230-1 forms a second link that makes up at least part of a second path of the access link 140-1. PVC 230-2 may be configured as an alternate to PVC 230-1. Accordingly, when the PVC 230-1 reaches or exceeds a predetermined utilization threshold, the system 200 may be configured to reroute at least a subset of data transmissions from PVC 230-1 to PVC 230-2. The rerouting of data transmissions based on link utilization rates will be discussed in more detail below.

As with system 100 of FIG. 1, in system 200, the provider edge routers 130 are in connection with the core routers 170 by the transport links 180, and the core routers 170 are connected to each other by the core network link 190.

System 200 is configured so that data transmissions over the network framework 116 can be simulated and monitored. In order to simulate network parameters of operational networks, the system 200 may include software or other tools to inject network parameters such as packet loss, delay, jitter, and the like into data transmissions sent over paths of the network framework 116 of the system 200. In particular, this allows the system 200 to emulate a long-haul core IP network.

To illustrate the capabilities of the system 200 for simulating voice transmissions, an example of a voice transmission simulation scenario will now be described in detail. However, other types of data transmissions (e.g., video streams) may be simulated using the system 200. While voice transmissions may flow over the network shown in FIG. 2 in either direction (i.e., from the signal generator 110-1 to the QoS monitor 195-2 and from the signal generator 110-2 to the QoS monitor 195-1), for purposes of explanation, simulations involving voice transmissions in the form of telephone calls generated by the signal generator 110-1 and received by the QoS monitor 195-2 will now be described.

To enable voice traffic simulations, the signal generators 110 are configured to simulate various traffic loads over one or more segments of any of the network paths formed by the system 200. The path for the simulation example described herein is the path traveled by data streams transmitted from the signal generator 110-1 to the QoS monitor 195-2. The signal generator 110 may include one or more load generators to produce different levels of traffic loads on the media path. Other devices in the system 200 may also include load generators for simulating traffic loads on particular segments of network paths of the system 200.

By generating various levels of traffic loads over a particular path, or particular segments of the path, the system 200 is able to measure voice quality in relation to traffic loads (i.e., link utilizations), as described below. Initial measurements may be taken with no load on the particular path in order to establish baseline network path properties. In one embodiment, the signal generator 110-1 is configured to generate and transmit different traffic loads for predefined time intervals so that measurements can be taken to help identify changes in QoS parameters as a function of varying traffic loads. For example, the signal generator 110-1 may produce traffic loads in twenty percent increments of bandwidth capacity.

In one simulation scenario, three telephone calls are placed simultaneously by the signal generator 110-1. The telephone calls may comprise RTP streams generated by the signal generator 110-1 and sent over media particular network path to the signal generator 110-2 or the QoS monitor 195-2. The QoS monitor 195-2 is able to monitor end-to-end QoS parameters and other data associated with the telephone calls passing over the selected network path formed by the system 200. Once measurements have been gathered for the three telephone calls, the number of telephone calls is increased to four telephone calls, and associated data gathered by the QoS monitor 195-2. Then the number of telephone calls is increased to five and associated data gathered by the QoS monitor 195-2.

In one embodiment, the calls are placed in accordance with G.711, which is known to those skilled in the art. A G.711-based telephone call typically utilizes approximately 100 kilobits per second of bandwidth as it traverses a network path. In other voice data simulation scenarios, other telephone call protocols, such as G.729b, may be used.

While the simulation example described herein includes the signal generator 110-1 providing IP-based voice signals, any known telephone call endpoint or transmission device may be connected with the system 200 and used to generate telephone calls over the call path formed by the system 200. For example, the system 200 may be connected with time-division multiplexing (TDM) devices, class-5 switches, SS7 devices, PSTN devices, servers, IP/PSTN gateways, and other known telephony devices. Further, simulated voice traffic may be generated and received by different call endpoints and devices in connection with the network framework 116 of the system 200. Other types of devices may also be used for simulations of different types of data transmissions.

By simulating various loads of voice traffic over a network path (or segments of the network path), the system 200 is able to provide measurements of voice quality. The measurements of voice quality may be in terms of QoS parameters, including MOS, PESQ, delay, jitter, and packet loss, which are helpful for analyzing the network characteristics and performance of the media path. As known to those skilled in the art, these QoS parameters affect the voice quality of VoIP transmissions. For example, packet loss over a one-hop network typically should not exceed one percent of the transmitted packets. Similarly, MOS should be 4.0 or greater for toll-quality voice services.

Measurements of end-to-end QoS parameters may be obtained by the QoS monitors 195 for simulated traffic loads. The QoS parameters provide a quantified measure of voice quality and can be used to analyze voice quality based on bandwidth utilization of links of network path formed by the system 200. For this analysis, link utilization rates of the links of the particular network path are monitored. While the system 200 may be configured to monitor utilization rates on any of the links forming any of the paths over the network framework 116, FIG. 2 shows an example of the ingress link 140-1 being monitored by the link utilization monitor 150-1 because the ingress link 140-1 is the bottleneck (i.e., the lowest bandwidth capacity) link of the system 200. Because the ingress link 140-1 has the lowest bandwidth capacity of the different links of the network framework 116, the bandwidth utilization of the ingress link 140-1 prominently affects the QoS of data transmissions. As shown in FIG. 2, the link utilization monitor 150-2 should similarly monitor the bandwidth utilization of the egress link 140-2.

Figure 3:
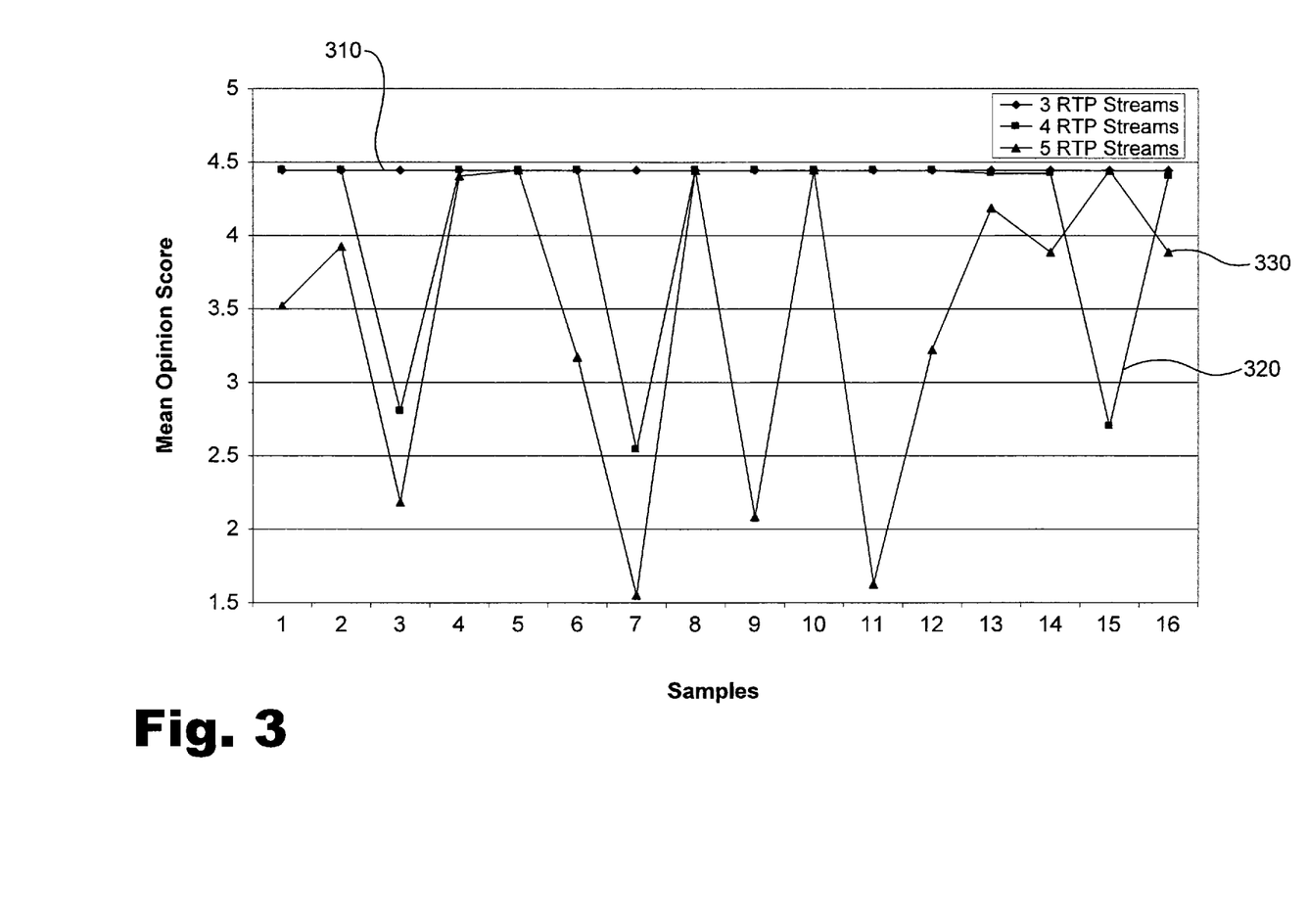
FIG. 3 is a chart illustrating measured mean opinion scores (MOS) for different quantities of voice data streams transmitted over the system of FIG. 2, according to one embodiment.
Figure 4:
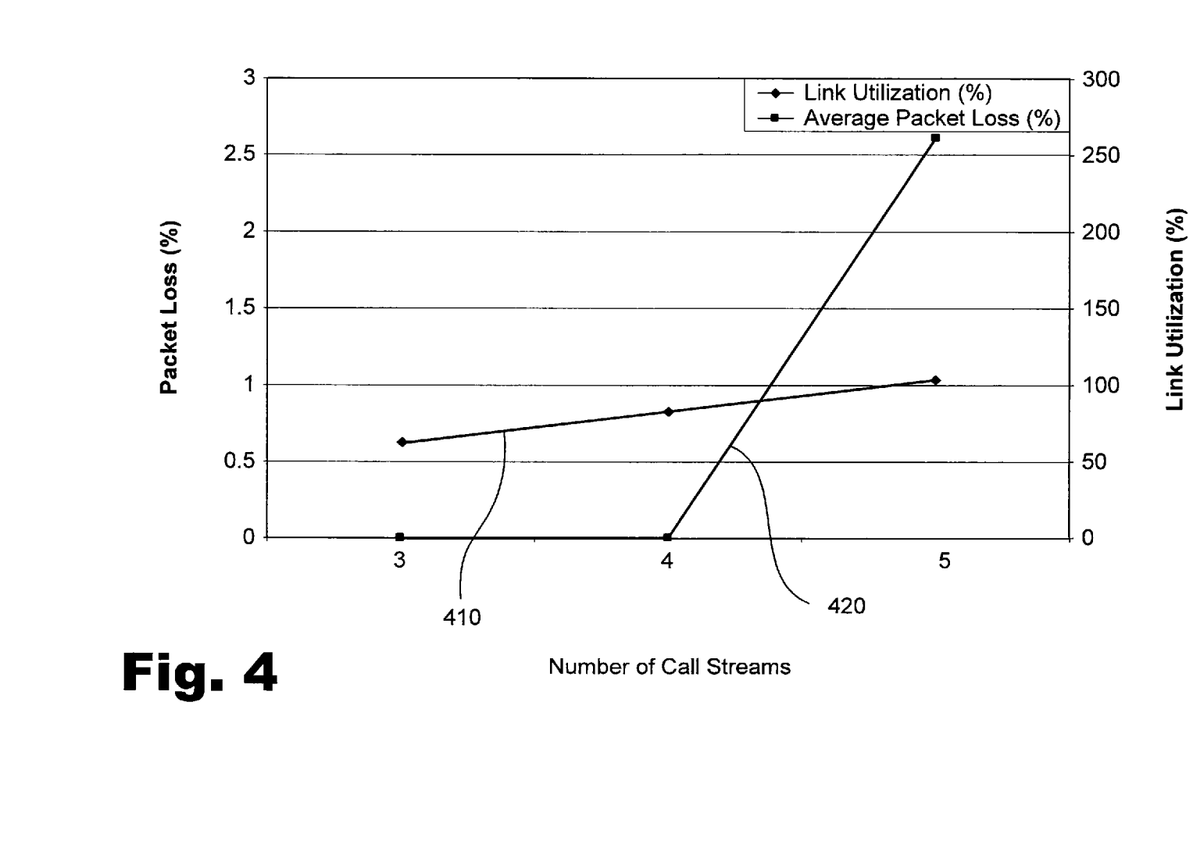
FIG. 4 is a chart illustrating measured packet loss and link utilization for different quantities of voice transmission packet streams being transmitted over the system of FIG. 2, according to one embodiment.

As simulated telephone calls are transmitted from the signal generator 110-1, over the ingress link 140-1, and to the signal generator 110-2 or the QoS monitor 195-2, the utilization rate of the ingress link 140-1 is monitored and compared with the QoS parameters measured by the QoS monitor 195-2 to determine the link utilization rates at which the measured QoS parameters are identified as deteriorating below desired quality thresholds (e.g., a toll-grade MOS or a specific packet-loss rate). FIGS. 3 and 4 illustrate measured relationships of QoS parameters and link utilization rates for the voice transmission simulation scenario described above.

FIG. 3 is a chart of the determined MOS value per telephone call for the above-described voice transmission simulation scenario. FIG. 3 illustrates determined MOS values corresponding to when three, four, and five active telephone calls are simulated over the network framework 116. The vertical axis of the chart represents the MOS value, and the x-axis of the chart represents the number of samples that were taken for each simulation. As shown in plot 310 of FIG. 3, for the case in which three telephone calls are transmitted over a single PVC 230-1 of the ingress link 140-1, the determined MOS for each call remains steady at a value of approximately 4.45.

As the number of active telephone calls over the network framework 116 is increased to four, degradation in call quality is observed. As shown by plot 320 in FIG. 3, several mean opinion scores have dropped below a value of approximately 3.0. As the number of telephone calls is increased to five, voice quality is even more severely degraded. As shown by plot 330 in FIG. 3, several telephone calls now have MOS values below 2.5. The relatively lower MOS values shown in FIG. 3 for quantities of four and five telephone calls is attributable to the packet loss and delay experienced by the data packets of the voice transmission streams as the PVC 230-1 of the ingress link 140-1 over which the data packets are traveling becomes more congested (i.e., higher utilization rates). The relationship of MOS to packet loss and link utilization is further illustrated in FIG. 4.

As shown in FIG. 4, average packet loss increases as the number of telephone calls over the network framework 116 increases (i.e., link utilization increases). In FIG. 4, plot 410 represents the link utilization of PVC 230-1 as a percentage of the bandwidth capacity of PVC 230-1, and plot 420 represents average percentage of the data packets of the telephone call data streams that are lost during transmission. Measurements of link utilization and packet loss are shown for three, four, and five telephone calls being active over the network framework 116. The x-axis of the chart of FIG. 4 represents the number of active calls being simulated.

As shown in FIG. 4, when three telephone calls are transmitted over PVC 230-1, approximately 62% of the bandwidth capacity of the PVC 230-1 is used, and no measurable amount of packet loss is observed. When four telephone calls are transmitted, a link utilization rate of approximately 83% for PVC 230-1 and a packet loss of approximately 0.001% are observed. In the case of five telephone calls being transmitted, a packet loss of approximately 2.6% is observed, and the link utilization rate of PVC 230-1 is approximately 103%. Thus, at five telephone calls, the link utilization rate exceeds the link capacity by approximately three percent.

From FIGS. 3 and 4, as well as the simulation described above, it can be seen that as link utilization increases beyond a certain utilization threshold, several of the telephone calls currently admitted for transmission over the network framework 116 of system 200 experience degradation in voice quality. Key utilization rates associated with voice quality deteriorations can be determined from the telephone call simulations of the system 200. For example, when PSTN-grade call quality (MOS of approximately 4.0 or greater) is desired, FIGS. 3 and 4 show that a link utilization rate not greater than approximately 60% along the ingress link 140-1 will consistently maintain a MOS that is satisfactory for PSTN-grade quality. This relationship is determined based on the measured data for three active telephone calls over PVC 230-1 of the network framework 116. Observation of QoS parameters for three telephone calls identified consistently acceptable MOS values above PSTN-grade call quality and a corresponding link utilization rate of approximately 62% of link capacity.

The simulation scenario described above is merely illustrative. System 200 is able to simulate various voice traffic loads (i.e., link utilization rates) along any different path segment of the network framework, including any of the PVC 230. Further, data types other than voice transmissions may be simulated. Accordingly, operators are able to use the system 200 to identify link utilization rates of network links (e.g., a bottleneck link) that correspond with degradations in data transmission quality below desired levels.

The identified utilization rates may be used as link utilization thresholds for maintaining desired quality levels by limiting link utilization to rates that do not exceed the link utilization thresholds. To maintain desired quality levels, the system 200 may provide for adjusting the amount of active bandwidth by activating and/or de-activating network links in order to maintain link utilization rates below the predetermined link utilization thresholds. The adjusting of active bandwidth based on predetermined link utilization thresholds can be implemented in the systems 100 and 200, as well as in operational networks having frameworks similar to those of systems 100 and 200, as discussed below.

III. Maintaining Link Utilization Rates

Returning to FIG. 2, once data traffic simulations have been performed and the link utilization thresholds determined, the link utilization thresholds may be integrated into the system 200 to maintain desired levels of data transmission quality. This can be done by configuring the system 200 to maintain link utilization rates at or below the link utilization thresholds. As a result, QoS parameters of voice services will not deteriorate below desired quality thresholds.

As data streams are transmitted over a particular path of the network framework 116, link utilization rates are monitored for selected links. For example, the link utilization monitor 150-1 is configured to monitor link utilization rates of any of the PVCs 230 of the ingress link 140-1. The system 200 compares the monitored link utilization rates with the link utilization thresholds. If the link utilization rates exceed the link utilization thresholds, the system 200 recognizes that additional bandwidth should be provided to reduce the link utilization rate of the link(s) being monitored. The system 200 is able to provide notice to network operators to indicate that additional bandwidth should be activated. Additional bandwidth may be activated by operators using interfaces with the edge router 220 of FIG. 2. It is also anticipated that known techniques may be implemented in the system 200 for automatically activating additional bandwidth in response to link utilization rates exceeding predetermined thresholds.

To illustrate the maintaining of data transmission quality by managing bandwidth in response to monitored link utilization rates, reference may be made to the link utilization rates of the ingress link 140-1 of the system 200. For the simulation scenario described above, a link utilization threshold is identified for the ingress link 140-1. Based on the measurements shown in FIGS. 3 and 4, in one embodiment the link utilization threshold may be set to approximately 60% because at a link utilization rate of approximately 62%, the MOS values for each telephone call remains above PSTN-grade quality (MOS of 4.0). However, at a utilization rate of approximately 83%, several telephone calls exhibit MOS values below PSTN-grade quality. That is, the MOS values of all calls degrade since transmission capacity is shared by all the sessions (calls).

The determined link utilization threshold (e.g., approximately 60%) may be implemented in the system 200 in order to maintain link utilization rates not in excess of the threshold. As data streams are transmitted over the ingress link 140-1, the link utilization monitor 150-1 monitors the utilization rate of the access link 140-1. More specifically, the link utilization monitor 150-1 monitors the link utilization rate of each active PVC 230 of the ingress link 140-1. When the link utilization monitor 150-1 determines that a link utilization rate of an active PVC 230 has exceeded the predetermined utilization threshold, the system 200 may activate one or more additional PVCs 230 of the ingress link 140-1 in order to increase the amount of available bandwidth. Telephone calls may then be rerouted over the newly activated PVCs 230 to decrease the utilization rate of the monitored PVC 230.

Conversely, minimum link utilization thresholds may be implemented to prevent an excessive number of PVCs 230 from remaining active when utilization rates are low. For example, if three PVCs 230 are active and carrying telephone calls at low enough rates that two PVCs 230 could transmit the calls without exceeding the predetermined maximum utilization thresholds, then one of the active PVCs 230 may be deactivated to conserve network resources.

PVCs 230 may be activated and deactivated using techniques known to those skilled in the art. In the system 200 of FIG. 2, the customer edge routers 115 and/or provider edge routers 130 may be configured to activate and deactivate the PVCs 230 between them. As known to those skilled in the art, interfaces (not shown) to the customer edge routers 115 and/or the provider edge routers 130 may be provided to allow network operators to control the activation and/or deactivation of the PVCs 230. Accordingly, the system 200 may be configured to provide notification to network providers when it is determined that available bandwidth should be increased or decreased to appropriately accommodate the monitored link utilization rates. In this manner, resources are managed based on the monitored link utilization rates, and data transmission quality is maintained at desired levels.

It is also anticipated that known or future techniques for automatically activating and deactivating available link bandwidth may be used in the system 200 to automatically manage available bandwidth based on monitored utilization rates.

The above-described example of identifying and using link utilization thresholds to maintain QoS levels is merely illustrative. Different link utilization thresholds may be identified and implemented for different segments of different networks and for different types and mixes of data transmissions. Further, different QoS parameters, or different combinations of QoS parameters, may be monitored as used as thresholds to maintain data transmission quality above desired levels. For example, packet loss thresholds may be determined, monitored, and used to maintain desired levels of data transmission quality. In addition, other techniques for adjusting active or available bandwidth based on monitored QoS parameters may be used in some embodiments.

Figure 5:
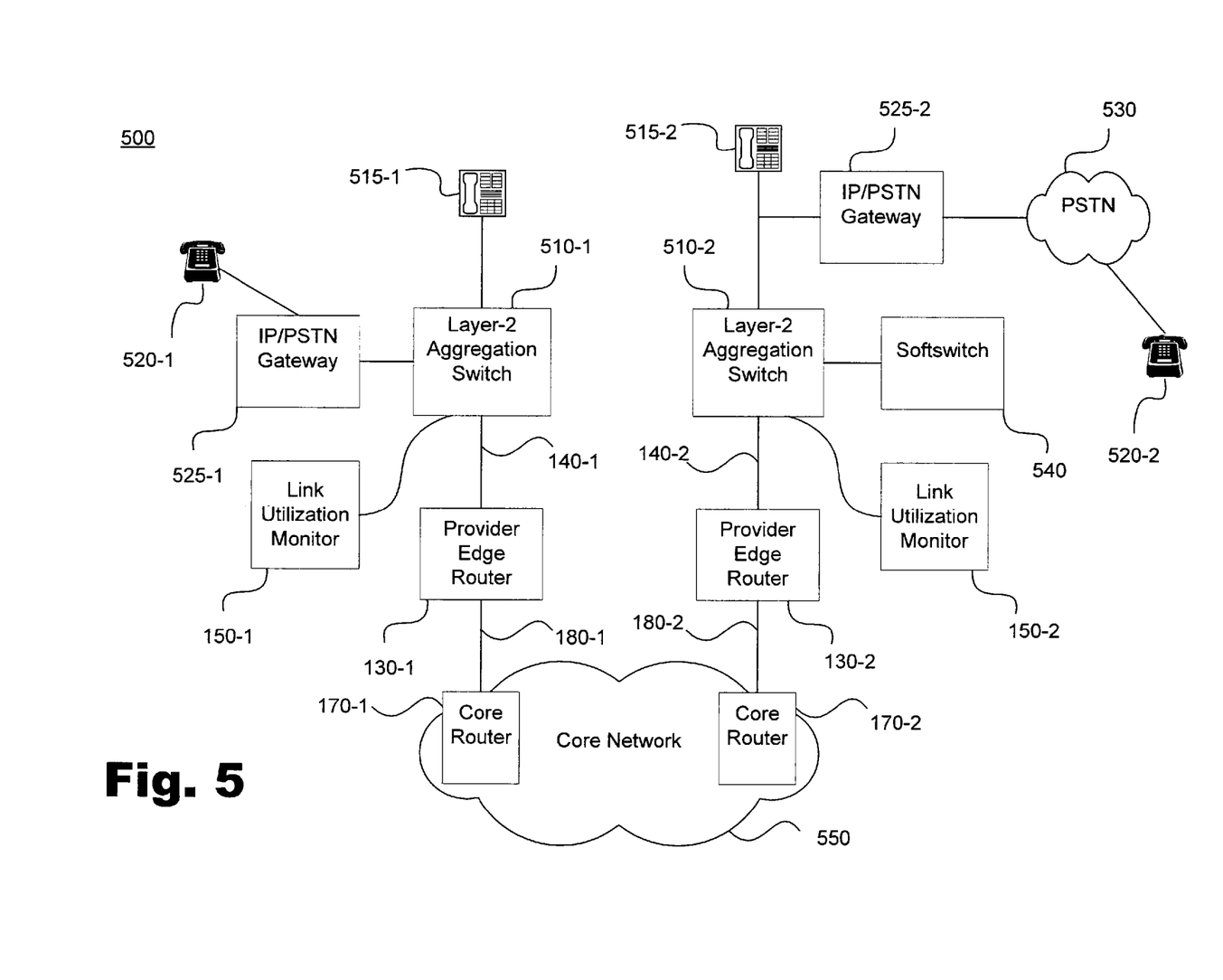
FIG. 5 is a block diagram of an operational VoIP network framework for monitoring link utilization and maintaining voice quality of service (QoS) levels based on the monitored link utilization, according to one embodiment.

The techniques described above for maintaining desired levels of quality for data-transmissions are not limited to use with the systems 100 and 200. The QoS parameter thresholds (e.g., link utilization thresholds) determined using the systems 100 and 200 can also be implemented in operational networks having designs similar (e.g., having a similar number of call legs) to the network frameworks 116 used for simulating data traffic to determine QoS parameter thresholds, as described above. For example, FIG. 5 is a block diagram of a network 500 that can be used as a test bed network as described above in relation to systems 100 and 200 and/or as an operational network configured to maintain and deliver a desired level of quality by adjusting the available bandwidth of network links (e.g., a bottleneck link) based on predetermined link utilization thresholds. While FIG. 5 shows the network 500 being used to transmit voice services transmissions, those skilled in the art will understand that the network 500 may be used to maintain desired quality levels for other types of data, or various mixes of different types of data, being transmitted over the network 500.

A. Layer-2 Aggregation Switch

The network 500 includes layer-2 aggregation switches 510-1 and 510-2 (collectively "L2 aggregation switches 510") arranged to communicate with data endpoints, including IP endpoints 515-1 and 515-2 (collectively "IP endpoints 515") and TDM endpoints 520-1 and 520-2 (collectively "TDM endpoints 520"). The L2 aggregation switches 510 are configured to receive voice transmissions generated by the data endpoints and direct the voice transmissions over the access links 140 to appropriate provider edge routers 130. The L2 aggregation switches 510 may include devices known in the art for receiving and directing data transmissions.

B. IP Endpoints

The IP endpoints 515 can include any known device or devices for generating, transmitting, and/or receiving voice packet data transmissions, including but not limited to known IP telephones (e.g., session initiation protocol (SIP) telephones), servers, and integrated access devices (IADs) capable of transmitting and receiving voice packet data streams.

C. TDM Endpoints

The TDM endpoints 520 can include any known device or devices for generating, transmitting, and/or receiving TDM and/or PSTN voice transmissions, including but not limited to standard telephones known to those skilled in the art.

The TDM endpoints 520 are connected to the L2 aggregation switches 510 by internet protocol to public-switched telephone network (IP/PSTN) gateways 525-1 and 525-2, which are known to those skilled in the art. The TDM endpoint 520-2 shown in FIG. 5 is connected to the IP/PSTN gateway 525-2 by a public-switched telephone network (PSTN) 530 as will be understood to those skilled in the art.

Although not shown in FIG. 5, other known call endpoints and transmission points may be connected with the network 500 and configured to send and/or receive voice data transmissions over the network 500. For example, PSTN connections to the network 500 may include but are not limited to SS7 links to signal transfer points (STPs), or T1/IMT and FX links to class-5 switches, which will be understood by those skilled in the art.

D. Softswitch

A softswitch 540 is in connection with the layer-2 aggregation switch 510-2 and is configured with instructions for controlling the routing of voice transmissions to appropriate provider edge routers 130 for ingress signals and to appropriate call endpoints for egress signals. The softswitch 540 is able to control routing performed at the layer-2 aggregation softswitches 510-1 and 510-2. The softswitch 540 may be implemented using devices known to those skilled in the art.

E. Provider Edge Router

The provider edge routers 130 implemented in the network 500 shown in FIG. 5 are configured to receive data streams (e.g., telephone calls) from the L2 aggregation switches 510 and to route the data streams over the transport links 180 to the core routers 170 for transmission over a core network 550. For data streams traveling through the provider edge routers 130 in the opposite direction (i.e., from provider edge routers 130 toward the call endpoints, the provider edge routers 130 are configured to route the data streams to appropriate L2 aggregate switches 510.

As discussed above, the provider edge routers 130 implemented in the operation network of FIG. 5 may comprise virtual routers configured to activate and deactivate links making up the access links 140 and connecting the provider edge routers 130 with the L2 aggregation switches 510.

F. Core Network

The core network 550 may comprise any known packet-switched network capable of carrying packet data streams (e.g., voice-over-IP data streams). The core network 550 may comprise an IP, multi-protocol label-switched (MPLS), and/or IP/MPLS network or networks.

To maintain the quality of data transmitted over the network 500, link utilization rates of the network links may be monitored as discussed above. For example, for data streams traveling from layer-2 aggregation switch 510-1 to provider edge router 130-1, the link utilization monitor 150-1 monitors the link utilization of the ingress link 140-1. When, the link utilization monitor 150-1 detects a link utilization rate as having exceeded a predetermined utilization threshold, the steps discussed above may be executed to maintain utilization of the ingress link 140-1 below the predetermined utilization threshold. If link utilization rates exceed the predetermined utilization threshold, for example, additional bandwidth may be activated, as discussed above. In a similar manner, if link utilization rates are below predetermined minimum thresholds, bandwidth may be deactivated as long as the bandwidth remaining active is sufficient to maintain utilization rates at or below the predetermined maximum utilization thresholds.

IV. Process Flow Views

Figure 6:
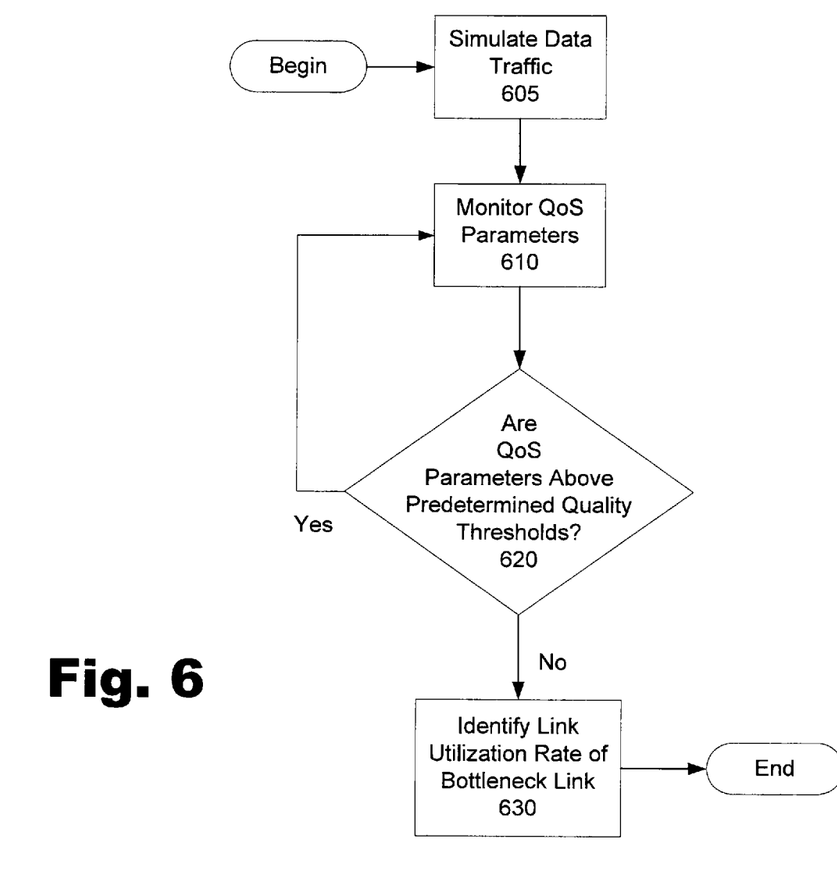
FIG. 6 is a flowchart illustrating a method of identifying a link utilization threshold for a bottleneck link of the system of FIG. 1.
Figure 7:
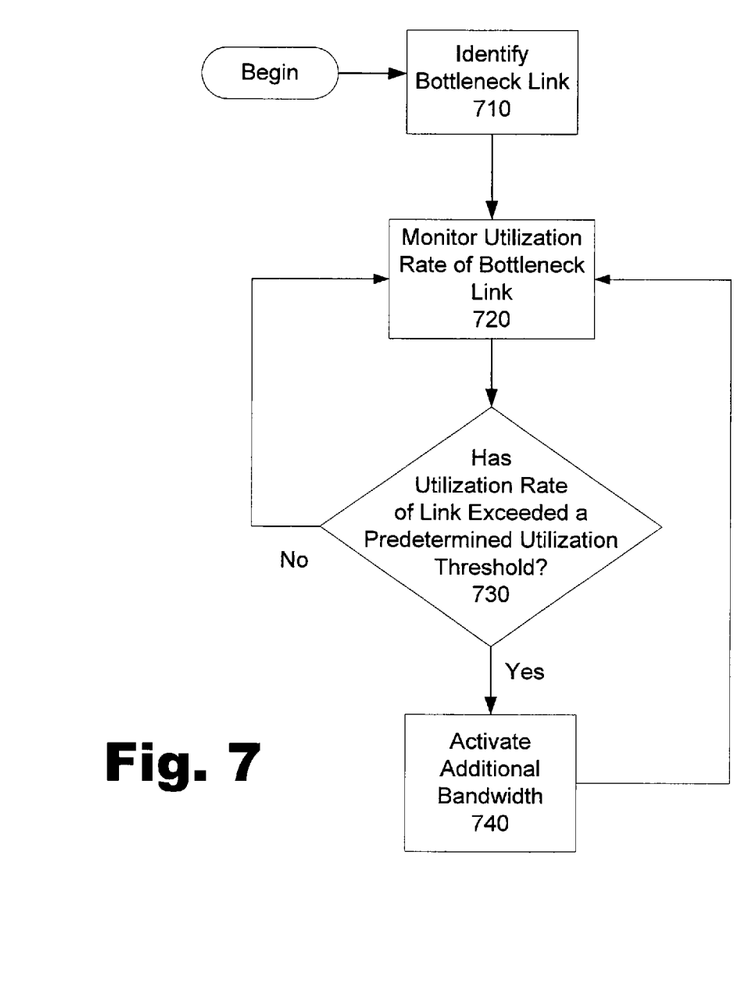
FIG. 7 is a flowchart illustrating a method of maintaining QoS parameters for data transmissions, based on link utilization levels.

FIGS. 6 and 7 illustrate examples of methods of determining appropriate link utilization thresholds useful for maintaining QoS levels of data transmissions by allocating bandwidth based on monitored link utilization rates. While the methods of FIGS. 6 and 7 are directed to bottleneck links of a network, those skilled in the art will understand that the steps of the methods may be applied to other network links.

FIG. 6 is a flowchart illustrating a method of identifying a link utilization threshold for a bottleneck link of the system 100 of FIG. 1. As shown in FIG. 6, data traffic is simulated over the bottleneck link at step 605. Step 605 may be performed according to the description of simulating data transmissions over the network framework 116 described above. QoS parameters associated with the simulated data traffic are monitored at step 610. The QoS parameters may be monitored at the bottleneck link (e.g., the ingress link 140-1) of a network designed for simulating data transmissions over packet-switched networks, as discussed above. While potentially any QoS parameter(s) may be monitored at step 610, in one embodiment bandwidth utilization rate of at least one link is monitored.

At step 620, it is determined whether the monitored QoS parameters are above predetermined quality thresholds. The predetermined quality thresholds may be defined by a network operator based on particular applications of the network. A network operator may set a predetermined quality threshold to correspond with a desired level of service. For example, a network operator may set a threshold value for QoS parameters such as packet loss, bandwidth utilization rate, transmission delay, jitter, or any other parameter useful for measuring quality of data transmissions. For a VoIP application for example, a predetermined quality threshold may be set to a MOS value of 4.0 for PSTN-grade voice transmissions. If it is determined at step 620 that QoS parameters are above the predetermined quality thresholds, as defined by a network operator, processing returns to step 610 for continued monitoring of QoS parameters.

On the other hand, if it is determined at step 620 that the monitored QoS parameters are not above the predetermined quality thresholds, processing moves to step 630. At step 630, a link utilization rate of a bottleneck link is identified, as discussed above. The link utilization rate corresponds with the utilization rate at which the QoS parameters deteriorate below the predetermined quality thresholds. The link utilization rate may be implemented in networks as a link utilization threshold to maintain the quality of the QoS parameters, as shown in FIG. 7.

FIG. 7 is a flowchart illustrating a method of maintaining QoS levels for data transmissions based on the link utilization rates determined in FIG. 6. At step 710, the bottleneck link of a network is identified. This determination may be based on bandwidth capacity. The bottleneck link is typically the ingress link 140-1 of a network. Processing then moves to step 720, at which step bandwidth utilization rates of the bottleneck link are monitored, as discussed above.

At step 730, it is determined whether the determined link utilization rate has exceeded a predetermined utilization threshold. If it is found at step 730 that the utilization rate has not exceeded the predetermined utilization threshold, processing returns to step 720 for continued monitoring of the utilization rates.

On the other hand, if it is determined at step 730 that the utilization rate has exceeded the predetermined utilization threshold, processing moves to step 740. At step 740, additional bandwidth is activated and data transmissions rerouted to distribute the data streams being transmitted over the ingress link 140-1 among additional links, thereby maintaining utilization rates below the predetermined utilization thresholds. Processing then returns to step 720 for continued monitoring of the utilization rates.

By activating and deactivating bandwidth based on utilization rates and utilization thresholds, desired levels of data transmission quality are maintained and delivered while using an appropriate amount of bandwidth resources for the measured amounts of traffic on network links. Bandwidth can be activated as traffic load increases so that additional data streams are not rejected from network admission based on priority. In some embodiments, known admission controls can be made secondary to the bandwidth utilization techniques discussed herein so that data streams will not be rejected from admission to the network unless traffic loads are extreme enough that all available bandwidth is active and being utilized at or near the determined utilization thresholds.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. For example, while several examples relating to voice services transmissions of IP networks have been described herein, the invention may be practiced for different types of data transmissions. It is intended that the scope of the invention be defined by the following claims.

What is claimed is:

1. A system comprising:
a packet-switched network configured to carry at least one data transmission from a first endpoint to a second endpoint, said packet-switched network including:
at least one router configured to route the at least one data transmission over said packet-switched network; and
a plurality of links including a first link and a second link, said first link forming at least part of a first path between the first endpoint and the second endpoint, and said second link forming at least part of a second path between the first endpoint and the second endpoint;
a first link utilization monitor including a processor and a memory and disposed between a first customer edge router and a first provider edge router in the first path, the first link utilization monitor configured to monitor a first link utilization rate associated with said first link and a second link utilization monitor including a processor and a memory and disposed between a second customer edge router and a second provider edge router in the second path, the second link utilization monitor configured to monitor a second link utilization rate associated with said second link, the link utilization monitors being configured to determine whether at least one of said first link utilization rate and said second link utilization rate is outside a range defined by a predetermined maximum utilization threshold and a predetermined minimum utilization threshold;
wherein said at least one router is configured to reroute at least a subset of the at least one data transmission over said second link in response to said link utilization monitor determining that said first link utilization rate associated with said first link has exceeded said predetermined maximum utilization threshold, and said at least one router is configured to reroute said subset of the at least one data transmission over said first link based on a determination that said second link utilization rate is lower than said predetermined minimum utilization threshold.

2. The system of claim 1, wherein said first link comprises a bottleneck link of said packet-switched network framework.

3. The system of claim 1, wherein said predetermined maximum utilization threshold is indicative of the link utilization rate of said first link at which at least one QoS parameter deteriorates to a value lower than a predetermined quality threshold.

4. The system of claim 3, wherein the at least one data transmission comprises at least one voice service transmission, and said predetermined quality threshold comprises a mean opinion score (MOS) corresponding with toll-grade or business-grade voice services.

5. The system of claim 1, wherein said first link and said second link comprise permanent virtual circuits or virtual local area networks.

6. The system of claim 1, wherein said link utilization monitors are configured to provide notification to a network operator in response to said link utilization rate being determined to have exceeded said predetermined maximum utilization threshold or to be lower than said predetermined minimum utilization threshold.

7. The system of claim 6, wherein said at least one router includes an interface providing the network operator with controls for activating or deactivating any of said plurality of links.

8. The system of claim 1, wherein said at least one router includes a customer edge router and a provider edge router, and said first link and said second link are each disposed between said customer edge router and said provider edge router.

9. The system of claim 1, wherein said predetermined maximum link utilization threshold is no greater than approximately sixty percent of the bandwidth capacity of said first link.

10. The system of claim 1, wherein said at least one router is configured to adjust the amount of available bandwidth between the first endpoint and the second endpoint by activating or deactivating any of said plurality of links, said activating and deactivating being based on at least one of said first link utilization rate and said second link utilization rate.

11. The system of claim 1, further comprising a quality-of-service (QoS) monitor configured to monitor at least one QoS parameter, said QoS monitor being configured to determine whether the at least one QoS parameter is lower than a predetermined quality threshold; and
    whereby said link utilization monitors are configured to set a value of said predetermined maximum utilization threshold, said value being based on the link utilization rate at which the at least one QoS parameter is determined to deteriorate below said predetermined quality threshold.

12. The system of claim 1, wherein said packet-switched network is associated with at least one of an operational packet-switched network and an emulated packet-switched network.

13. A method comprising:
    monitoring a utilization rate of a first link as at least one data transmission is transmitted over said first link;
    determining whether said utilization rate has exceeded a predetermined maximum utilization threshold;
    rerouting at least a subset of the at least one data transmission over a second link in response to a determination that said utilization rate has exceeded said predetermined maximum utilization threshold, said second link being an alternative to said first link;
    de-activating said second link in response to a determination that a second utilization rate of the second link is lower than a predetermined minimum utilization threshold and rerouting said subset of the at least one data transmission over the first link.

14. The method of claim 13, further comprising providing notification to a network operator in response to a determination that either said utilization rate has exceeded said predetermined maximum utilization threshold or that said second utilization rate is lower than said predetermined minimum utilization threshold.

15. The method of claim 13, further comprising:
    transmitting the at least one data transmission over at least said first link;
    monitoring at least one QoS parameter associated with the at least one data transmission;
    determining whether the at least one QoS parameter is lower than a predetermined quality threshold;
    determining a bandwidth utilization rate of said link at which the at least one QoS parameter is determined to deteriorate below the predetermined quality threshold; and
    setting said predetermined maximum utilization threshold to a value not greater than approximately the determined bandwidth utilization rate.

16. The method of claim 15, wherein said value of the link maximum utilization threshold is set within a range of approximately fifty-percent to sixty-percent utilization of the bandwidth capacity of said one link.

17. The method of claim 13, wherein said first link is associated with at least one of an operational packet-switched network and an emulated packet-switched network.

18. A system comprising:
    a plurality of links including a first link and a second link, said first link forming at least part of a first path between a first endpoint and a second endpoint, and said second link forming at least part of a second path between the first endpoint and the second endpoint;
    a first link utilization monitor including a processor and a memory and disposed between a first customer edge router and a first provider edge router in the first path, the first link utilization monitor configured to monitor a first link utilization rate associated with said first link and a second link utilization monitor including a processor and a memory and disposed between a second customer edge router and a second provider edge router in the second path, the second link utilization monitor configured to monitor a second link utilization rate associated with said second link, the link utilization monitors being configured to determine whether at least one of said first link utilization rate and said second link utilization rate is outside a range defined by a predetermined maximum utilization threshold and a predetermined minimum utilization threshold; and
    a router in communication with the first link and the second link, and configured to:
        route data transmissions over said first link;
        reroute a first portion of the data transmissions over said second link in response to said link utilization monitor determining that said first link utilization rate has exceeded said predetermined maximum utilization threshold while simultaneously routing a second portion of the data transmissions over said first link; and
        reroute said first portion of the data transmissions over said first link based on a determination that said second link utilization rate is lower than said predetermined minimum utilization threshold.

19. The system of claim 18, wherein the data transmissions include at least one data transmission comprising a Real-Time Protocol (RTP), G.711 or G.729 data stream.

20. The system of claim 18, further comprising a quality-of-service (QoS) monitor configured to monitor at least one QoS parameter, said QoS monitor being configured to determine whether the at least one QoS parameter is lower than a predetermined quality threshold;
    whereby said link utilization monitor is configured to set a value of said predetermined maximum utilization threshold, said value being based on the link utilization rate at which the at least one QoS parameter is determined to deteriorate below said predetermined quality threshold.

21. A method, comprising:
    monitoring a first link utilization rate associated with a first link and a second link utilization rate associated with a second link, said first link forming at least part of a first path between a first endpoint and a second endpoint, and said second link forming at least part of a second path between the first endpoint and the second endpoint;
    determining whether either said first or said second link utilization rate has exceeded a predetermined maximum utilization threshold or fallen below a predetermined minimum utilization threshold;
    routing data transmissions over said first link;
    rerouting a first portion of the data transmissions over said second link in response to said link utilization monitor determining that said first link utilization rate has exceeded said predetermined maximum utilization threshold while simultaneously routing a second portion of the data transmissions over said first link; and
    rerouting said first portion of the data transmissions over said first link based on a determination that said second link utilization rate is lower than said predetermined minimum utilization threshold.

22. The method of claim 21, wherein the data transmissions include at least one data transmission comprising a Real-Time Protocol (RTP), G.711 or G.729 data stream.

23. The method of claim 21, further comprising:
    monitoring at least one quality-of-service parameter; and
    determining whether the at least one QoS parameter is lower than a predetermined quality threshold;

whereby a value of said predetermined maximum utilization threshold is set, said value being based on the link utilization rate at which the at least one QoS parameter is determined to deteriorate below said predetermined quality threshold.

* * * * *